April 27, 1937.  M. JELALIAN  2,078,852

COIL SPRING CUSHION FENDER FOR AUTOMOBILES

Filed Nov. 5, 1936   3 Sheets-Sheet 1

Inventor:
Martin Jelalian

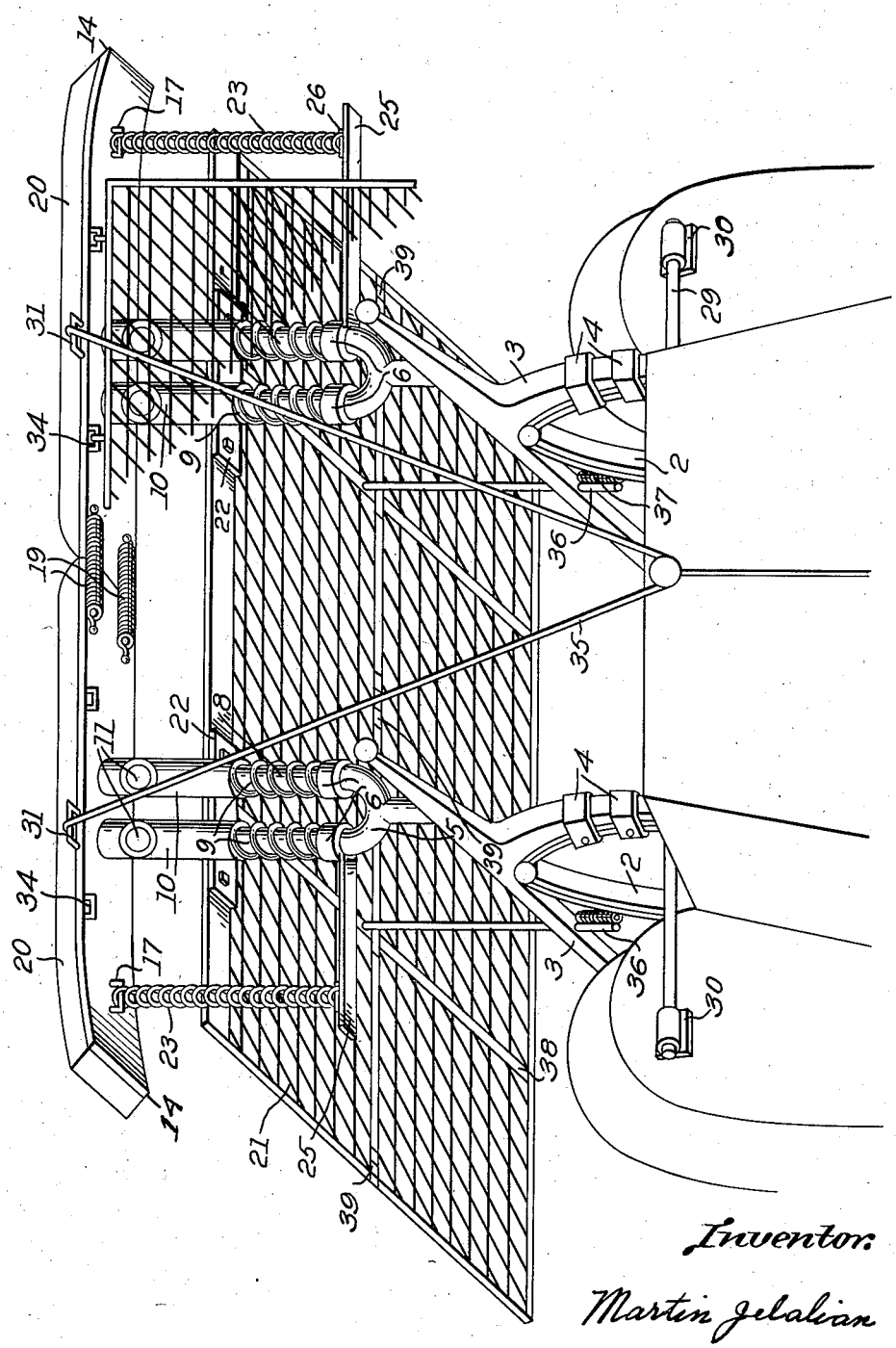

April 27, 1937. M. JELALIAN 2,078,852
COIL SPRING CUSHION FENDER FOR AUTOMOBILES
Filed Nov. 5, 1936    3 Sheets-Sheet 3
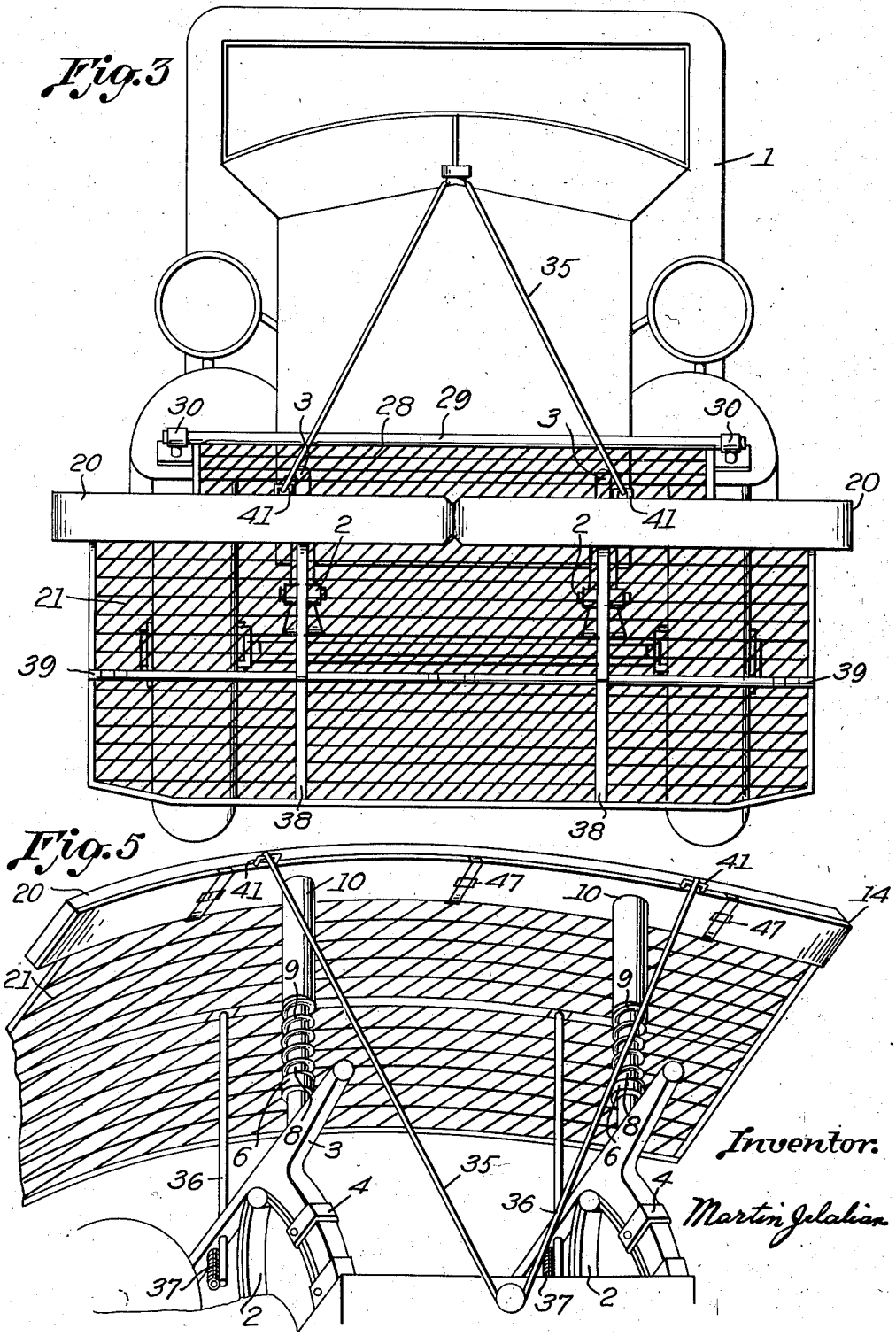
Inventor:
Martin Jelalian Patented Apr. 27, 1937

2,078,852

UNITED STATES PATENT OFFICE 2,078,852

COIL SPRING CUSHION FENDER FOR AUTOMOBILES

Martin Jelalian, New York, N. Y.

Application November 5, 1936, Serial No. 109,343

3 Claims. (Cl. 293—55)

The object of this invention is to provide a coil spring cushion shock absorbing fender for an automobile adapted to be secured to the front main springs of the same, to prevent damage to the vehicle when the latter comes into contact or collision with objects or vehicles.

The yieldable guard rails of the fender of the vehicle which are arranged in duplicate and flexible longitudinally and transversely thereof are provided with pads of yielding materials in order to prevent injury to a person when the latter is struck by the said yieldable guard rails, and a flexible wire net is arranged rearwardly of the same and adapted to receive a person therein when the latter is struck by the inner ends or nearby the inner ends of the said guard rails of the said fender, without causing injury to the said person.

A wire screen is also carried by the slidable tubular members of the said fender and depending therefrom and is adapted to prevent a person from being thrown under the wheels of the vehicle when the latter is struck by the outer ends or nearby the outer ends of the said yieldable guard rails of the said fender.

Figure 1:
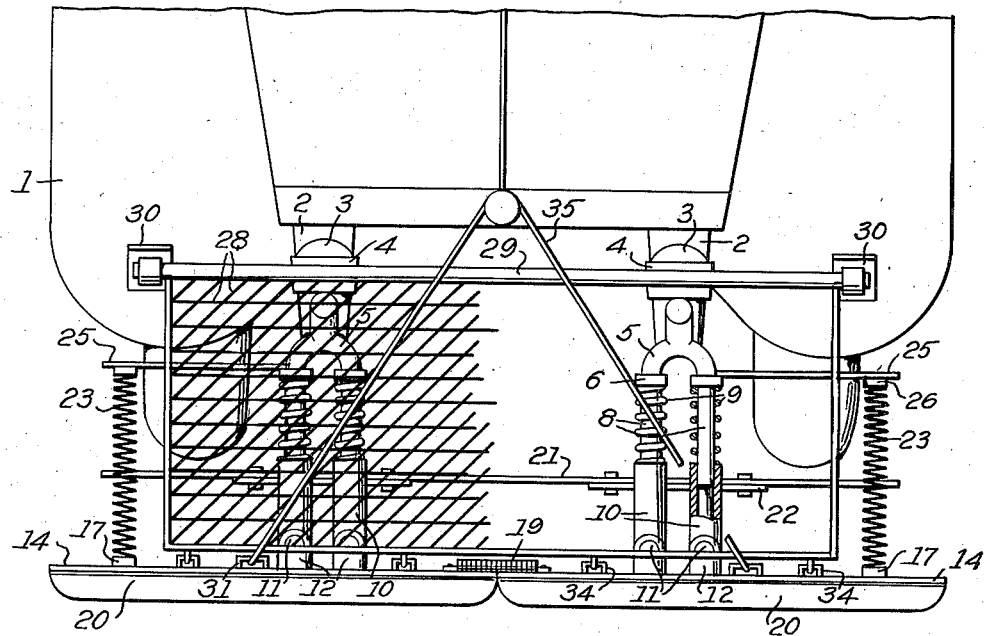
Figure 4:
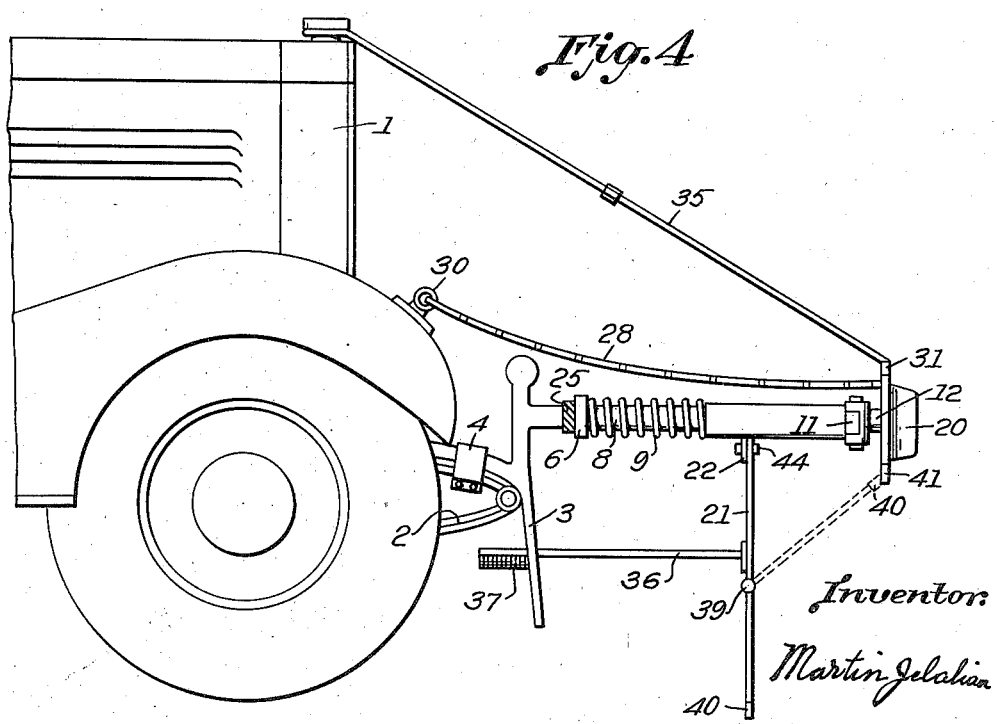

The detailed description of the invention is specified in the accompanying three sheets of drawings in which Fig. 1 is a plan view of my improved fender showing the parts of the device in their normal positions. Fig. 2 is a perspective view of the fender, looking toward the rear of its guard rails, and showing the parts of the fender in their relative positions. (Fig. 3 is a forward end view of my improved device. Fig. 4 is a side perspective view of my improved device and showing the parts of the same in their normal position. Fig. 5 is also a perspective view of the fender, looking toward the rear of its guard rails and the parts of the same as arranged in a modified form.

Referring to the drawings, the numeral 1 designates a forward end portion of an automobile which is provided with usual sets of flat springs 2.

On each set of springs 2 is a T-shaped support 3 which is secured to said springs by means of common clamp connections 4, 4 and provided with a forwardly projecting forked-shaped integral portion 5 having integral collars 6, 6 from which projects integral tubular shafts 8, 8.

The fender comprises two sections 14 their inner ends being in axial alignment with each other and having a pair of coil pull spring connections 19, 19 and each section 14, 14 is supporting a pair of tubular members 10, 10 which are slidably mounted upon the end portions of the said integral tubular shafts 8, 8 of the T-shaped supports 3, 3 that are provided with expanding coil springs 9, 9.

Expanding coil springs 9, 9 surround the said integral tubular shafts 8, 8 and having one of their ends secured to the said integral collars 6, 6 and the other ends connected to the end portions of the said tubular members 10, 10.

Each section of the guard rail 14, 14 of the fender is arranged with inwardly projecting integral tubular portions 12, 12 to receive slidable tubular members 10, 10 by pivotal connections 11, 11 in order to afford the fender to have flexibility longitudinally and transversely of the vehicle 1.

In order to prevent a person from being thrown under the wheels of the vehicle 1, I provide the fender with wire screen 21 which is detachably connected to the flat-sided integral portions 22, 22 of the slidable tubular members 10, 10 and is depending therefrom rearwardly of the guard rails 14, 14 of the fender.

Wire screen 21 comprises two sections pivotally connected to each other as shown at 39, 39 and is provided with a pair of guard strip connections 38, 38 which support rod connections 36, 36 that project through the lower flat sided portion of the T-shaped support 3 and having expanding coil spring connections 37, 37.

The fork-shaped integral portions 5, 5 of the T-shaped supports 3, 3 are also provided with flat sided outwardly projecting arms 25, 25 to receive assistant expending coil springs 23, 23 having one of their ends connected to the integral hooks 17, 17 of the guard rails 14, 14 and the other ends attached to the integral hooks 26, 26 of the said projecting arms 25, 25.

The lower section of the wire screen 21 is yieldable in a forward direction and has snap hook connections 40, 40 for readily connecting to the integral hooks 41, 41 of the guard rails 14, 14 of the fender when necessary as shown with dotted lines in Fig. 4.

I provide the guard rails 14, 14 of the fender with pads of yielding material 20, 20 in order to prevent injury to a person when the latter is struck by the said guard rails of the fender, and each guard rail 14 having an integral hook 31 to receive supporting strap connections 35.

The fender is also arranged with a flexible wire net 28 its forward end having a series of snap hook connections 34, 34 with the guard rails 14, 14 and its rear end provided with a rolling rod connection 29 which is adapted to roll said flexible wire net 29 thereon and is supported by supports 30, 30 that is secured to the side guards of the vehicle 1. The wire net 28 is designed to receive a person therein when the latter is struck by or nearby the inner ends of the said guard rails 14, 14 of the fender without causing injury to the said person.

In Fig. 5 is shown the device in a modified form of arrangement. In this arrangement, Fig. 5, each of the T-shaped supports 3 is provided with a forwardly projecting portion having an integral collar 6 from which projects a tubular shaft 8 and the fender comprises one guard rail 14 having a pair of tubular members 10, 10 integrally connected thereto and slidably mounted upon the end portions of the said tubular shafts 8, 8.

In this modified form Fig. 5, the flexible wire net connections 28 are omitted and the wire screen 21 comprises one section instead of two sections pivotally connected together and having connected to the guard rail 14 of the fender instead of the flat sided portions 22, 22 that are integral with the tubular members 10, 10.

Thus it will be obvious that by the arrangement of the device as described the damage of the vehicle will be avoided when the latter comes into contact with objects or vehicles and by the arrangement of pads of yielding materials 20, 20 on the guard rails 14, 14 of the fender will entirely prevent injury to a person when the latter is struck by the said guard rails of the vehicle.

Thus having fully described my invention, what I claim as new and desire to secure by Letters Patent is:

1. In combination with the front main springs of an automobile T-shaped supports each provided with a fork-shaped integral tubular member having integral collars and also integral tubular shafts projecting forwardly therefrom, a fender comprising a pair of guard rails, their inner ends being in axial alignment with each other and adapted to have flexibility longitudinally and transversely to the said vehicle, and the said guard rails provided with integral flat sided projecting portions having hingedly connected tubular members slidably mounted upon the end portions of the said integral tubular shafts of the said T-shaped supports, a pair of expanding coil springs for yieldably connecting the inner ends of the said guard rails of the said fender, and coil-spring supporting arms projecting outwardly from one side of each of the said fork-shaped integral tubular portions of the said T-shaped supports and having coil pull-spring connections with the said guard rails of the said fender.

2. In combination with the front main springs of an automobile, T-shaped supports each provided with a fork-shaped integral tubular portion having integral collars and also integral tubular shafts projecting forwardly therefrom, a fender comprising a pair of guard rails, their inner ends being in axial alignment with each other and designed to have flexibility longitudinally and transversely to the said vehicle, slidable tubular members pivotally connected to the integral projecting tubular portions of the said guard rails and slidably mounted upon the end portions of the integral shafts of the said T-shaped support, a wire screen comprising two sections forming upper and lower sections pivotally connected together, the upper section of the said wire screen being secured to the integral flat-sided transversely extending portions of the said slidable tubular members and depending therefrom and the lower section of the same adapted to have flexibility in a forward direction and provided with a series of snap hook connections for detachably securing to the said guard rails of the fender, and a pair of rod connections from the upper sections of the said wire screen and passing through the lower flat-sided portion of the said T-shaped support member and having coil pull-spring conections within the rear ends thereof.

3. In combination with the front main springs of an automobile, a T-shaped support, a fork-shaped forwardly projecting integral portion from said support and having integral collars and also integral tubular shafts projecting therefrom, a fender comprising a pair of guard rails, their inner ends being in axial alignment with each other and adapted to have flexibility longitudinally and transversely to the said vehicle, tubular members pivotally carried by the said guard rails and slidably mounted upon the end portions of the said integral tubular shafts, a flexible wire net connnections above the said slidable tubular members and integral tubular shafts of the said fender and designed to receive a persion thereon when the latter is struck by or nearby the inner ends of the said guard rails of the fender, a wire net rolling rod supported by the side guards of the said vehicle and extending transversely to the same and adapted to roll said flexible wire net thereon, and snap hook connections from the forward end of the latter for detachably connecting to the said guard rails of the said fender.

MARTIN JELALIAN.